United States Patent Office 3,534,544
Patented Oct. 20, 1970

3,534,544
ELECTRONIC WATCH
Henri Oguey, Peseux, Max Forrer, Neuchatel, and Armin Frei and Rolf Lochinger, Hauterive, Switzerland, assignors to Centre Electronique Horloger S.A., Brequet Neuchatel, Switzerland, a Swiss company
Filed Dec. 26, 1967, Ser. No. 693,622
Claims priority, application Switzerland, Dec. 30, 1966, 18,799/66
Int. Cl. G04c 3/00
U.S. Cl. 58—23                          16 Claims

ABSTRACT OF THE DISCLOSURE

An electronic watch comprising a piezoelectric quartz time base, a circuit for maintaining the oscillations of the quartz, a frequency dividing circuit, an electric motor for driving the indicating members, and a circuit for controlling the motor. The maintaining circuit is symmetrical and is coupled to the frequency-dividing circuit by means of a separate amplifying circuit.

---

The present invention concerns an electronic watch, in particular a small module watch such as a wrist or pocket watch, comprising a piezoelectric quartz time base, a circuit for maintaining the oscillations of the quartz, a frequency-dividing circuit, an electric motor driving the indicating members and a circuit controlling the motor, which is characterized in that the maintaining circuit is symmetrical and is coupled to the frequency-dividing circuit by means of a separate amplifying circuit and in that the control circuit comprises components and pulse-limiting components.

The drawing illustrates, by way of examples, two embodiments.

The watch, of which only the electric diagrams have been shown, comprises a platen bearing a sealed-in quartz, a battery contained in a case of plastic material, a bridge and a printed circuit. On the latter are mounted two electronic modules, containing the frequency dividing circuits and the motor control circuit, a module containing a series of condensers which may be connected in parallel in different ways for the fine adjustment of the quartz frequency, and an additional electronic component serving to compensate the quartz thermically by reducing the variation of the frequency as a function of the temperature variations.

The electrodynamic step-by-step motor (not shown) is composed of a flat coil the swinging motion of which is transformed into a step-by-step rotary motion by means of an anchor and an anchor wheel.

The mechanism (not shown) for setting the minute and hour hands may be actuated by a crown. By pulling it back, two wheels are caused to mesh, which enables the minute wheel to be driven by hand. A friction coupling allows the free rotation of the minute and hour hands, whilst the anchor wheel and the seconds hand are locked by the anchor and a pawl.

The two positions of the crown, "normal operation" and "setting" are defined by a lever and a spring. In the "setting" position, the lever acts on a relay contact which interrupts the motor circuit. By pulling out the crown the seconds hand may thus be stopped in the exact position desired. After the setting operation, for instance at the moment of the time signal, the crown is pushed back which disengages the two wheels and closes the relay contact again. The subsequent step of the motor occurs between 0 and 2 seconds after the closing of the contact. This simple arrangement thus allows a setting operation in which the minute hand is in place with the second hand, and this with a precision of ± one second. The oscillations of the quartz are not interrupted during the setting operation, an important advantage of this system which contributes towards maintaining the precision of the watch (ageing phenomenon).

Figure 1:
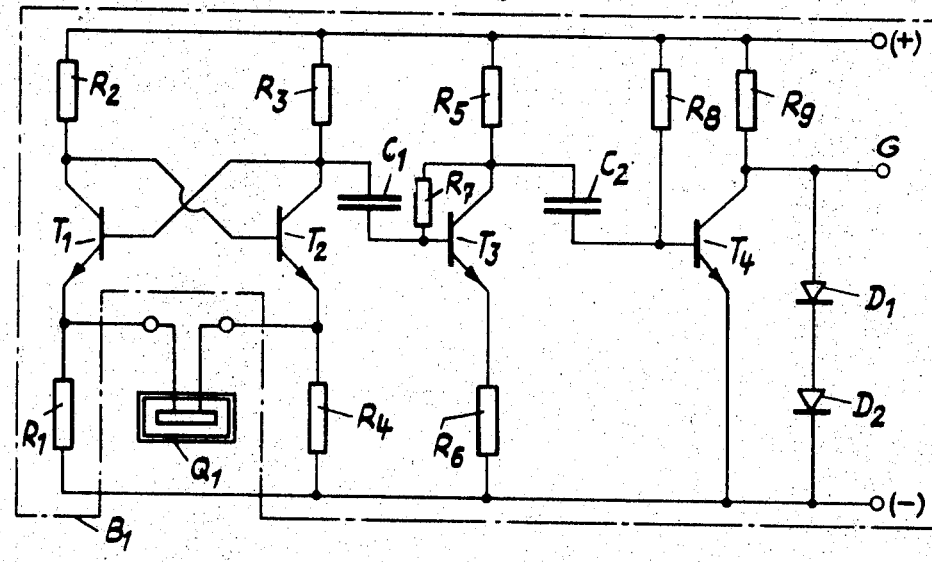
FIG. 1 shows the electric diagram of the quartz oscillator.

FIG. 1 shows the circuit of the oscillator, which can be formed on a flake of silicium $B_1$ of about 1.6 x 2.2 mm. The two first transistor stages $T_1$ and $T_2$ constitute, with the resistances $R_1$, $R_2$, $R_3$, $R_4$, the circuit proper for maintaining the oscillations $Q_1$ of the quartz oscillator. They are followed by two amplifying stages constituted, the first by the transistor $T_3$ and the resistances $R_5$, $R_6$ and $R_7$, the second by the transistor $T_4$ and the resistances $R_8$ and $R_9$. Both stages are coupled by condensers $C_1$ and $C_2$. The output signal from output G of oscillator $B_1$ is an approximately square wave which is applied to the input G of a chain of binary frequency-dividers (FIG. 4) and the amplitude of which is limited by the two diodes $D_1$ and $D_2$. The consumption of this quartz time base is about 5µw.

Figure 2:
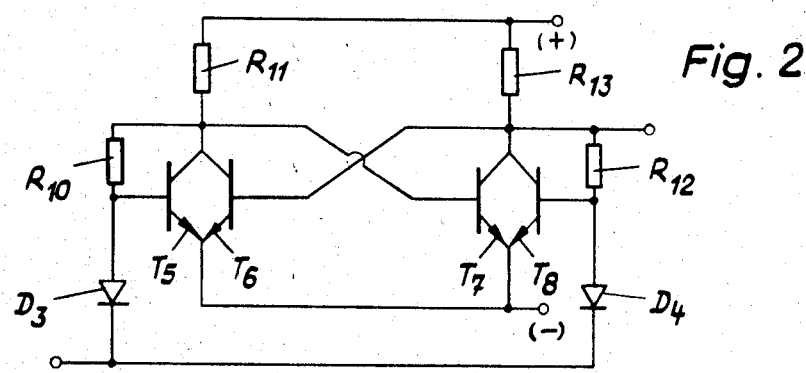
FIG. 2 shows the electric diagram of a stage of the frequency divider.
Figure 4:
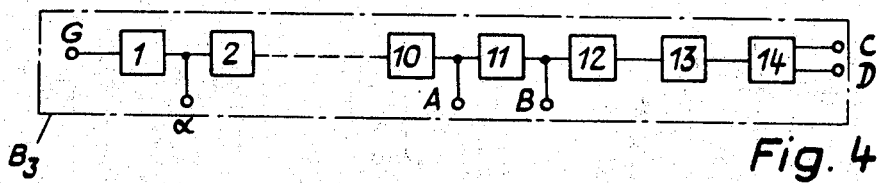

Each binary frequency-dividing stage (1–14, FIG. 4) may consist of a "spot" of silicium having the dimensions 1.5 x 1.25 mm. FIG. 2 shows the diagram of a stage connected as a flip-flop." This stage comprises two symmetrical parts, the first constituted by two in parallel coupled transistors $T_5$, $T_6$, two resistances $R_{10}$, $R_{11}$, and by the diode $D_3$, the second part being constituted by two in parallel coupled transistors $T_7$, $T_8$, two resistances $R_{12}$, $R_{13}$, and by the diode $D_4$. FIG. 4 shows a chain of 14 stages, 1–14 which, divides the input frequency received from the oscillator by a factor of $2^{14}=16384$. If the output frequency is set, for instance, at 0.5 Hz., then the frequency of the time base must be 8192 Hz. This chain is integrated in a block $B_3$.

The power consumption of these flip-flop (1–14) depends on their limit frequency (necessary switching time). The minimum theoretical consumption is obtained when each flip-flop has a limit frequency which is only slightly higher than its working frequency. This condition would require 14 different types of flip-flops, each having different loading resistances. In practice, the normal production dispersion already allows the components to be sorted and the choosing of the most rapid circuits for the first dividing stages. In addition, it may be shown that, by limiting the number of types of flip-flops to two only (two different values of the loading resistance $R_{11}$, $R_{13}$) the total consumption of the divider is about 5.5µw. This value is sufficiently near the minimum theoretical value, which proves that this solution represents a satisfactory compromise.

There exist other circuits which can be realized in integrated form, and capable of fulfilling the function of electronic frequency division.

Figure 3:
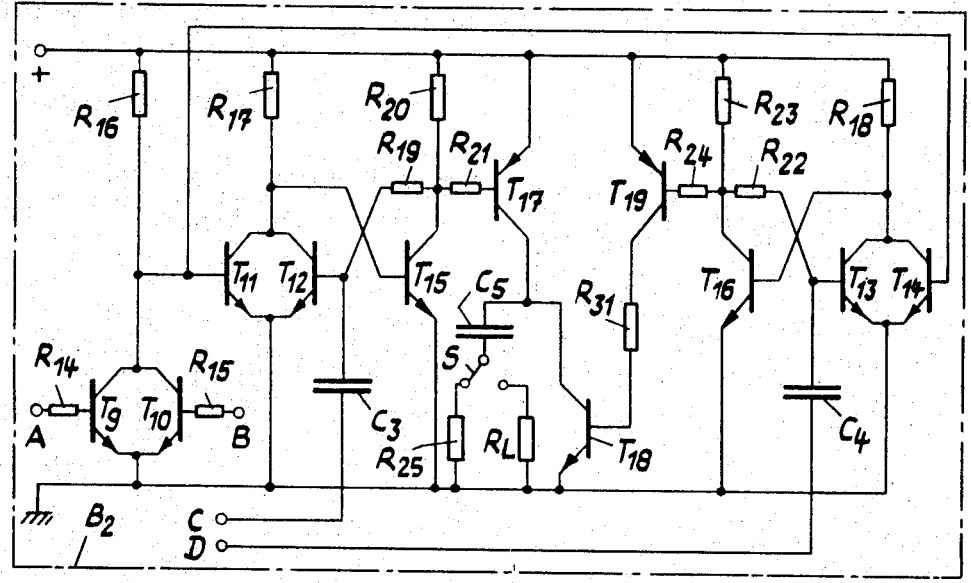
FIGS. 3 to 5 show the diagram and illustrate the operation of the motor control circuit, in the case where the motor is a step-by-step motor.
Figure 5:
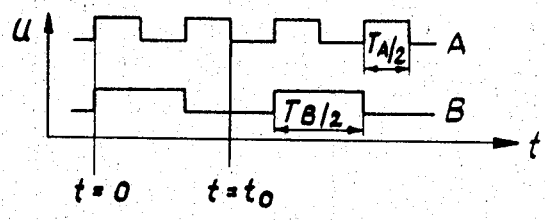

FIG. 3 shows the control circuit of an electrodynamic indicating anchor motor which generates bipolar voltage pulses which are applied to the motor coil. It has been chosen to determine the duration of the pulses by logical means. The inputs A and B are connected to the outputs A and B of two different flip-flops in the chain of demultiplication (FIG. 4) and the inputs C and D are connected to the outputs of the last dividing stage 14, which outputs are of opposite polarity. Transistors $T_9$ and $T_{10}$ form with the resistances $R_{14}$, $R_{15}$, and $R_{16}$ a logical gate "NOR", and the duration $t_0$ of the negative output pulse at the collectors of $T_9$ and $T_{10}$ is given by $\frac{1}{2}$ ($T_A+T_B$). $T_A$ and $T_B$ are the periods of the signals at the outputs A and B in the dividing chain and are schematically defined in FIG. 5. The output pulse of the "NOR" gate $T_9$, $T_{10}$, $R_{16}$ is applied to the first input of a second "NOR" gate $T_{11}$, $T_{12}$, $R_{17}$ and to the first input of a third "NOR" gate $T_{13}$, $T_{14}$, $R_{18}$. The output C of the dividing chain is applied to the second input of said second "NOR" gate through a condenser $C_3$ and the output D of the dividing chain is applied to said third "NOR" gate through a condenser $C_4$. The output of said second "NOR" gate $T_{11}$, $T_{12}$, $R_{17}$ is applied to the base of a transistor $T_{15}$, the collector of which is connected to three resistances $R_{19}$, $R_{20}$, $R_{21}$. The output of said third "NOR" gate $T_{13}$, $T_{14}$, $R_{18}$ is similarly applied to the base of a transistor $T_{16}$, the collector of which is connected to three resistances $R_{22}$, $R_{23}$, $R_{24}$. One armature of a condenser $C_5$ can be connected to the positive side $V_B$ by a transistor $T_{17}$ controlled by the transistor $T_{15}$ and to the earth by a transistor $T_{18}$, the base of which is in series with a resistance $R_{31}$ and a transistor $T_{19}$ controlled by the transistor $T_{16}$. The other armature of the condenser $C_5$ can be connected to the motor $R_L$ or the auxiliary resistance $R_{25}$ with a switch S. The beginning of the output pulse is defined by $I_1$ or $I_2$. By adding other "NOR" gates a pulse duration close to any value may be chosen. The purpose of the supplementary transistors is to reduce to a minimum the power consumed. The condenser $C_5$ is charged to the voltage $V_B/2$, and the amplitude of the voltage pulses applied to the motor $R_L$ is thus also $V_B/2$. This reduced voltage is advantageous as it allows the diameter of the coil wire to be increased and the number of windings to be reduced. The power consumed by the motor and its control circuit is about 8 to 5$\mu$w. This control circuit can be integrated in a bloc $B_2$.

When the crown is actuated to set the watch on time, the motor can be cut out whilst all the other parts of the watch continue to function and utilize, in place of the motor, the auxiliary resistance $R_{25}$ with the pulses. The electronic watch regularly requiring a certain time to pass from the complete stop to the regular operation when started, the circuit with a switch S and a loading resistance $R_{25}$ brings a notable technical progress with it. The described electronic watch continues thus to operate during the setting to the exact time and does not require to be restarted every time.

An important component of the watch with regard to the precision of its running, is constituted by the quartz oscillator. The quartz $Q_1$ contained in a case (FIG. 1) is constituted by a vibrating strip vibrating in the mode of flexion XY and suspended in its vibration nodes by two wires which also serve as electrical connections. Two glass-insulated through-leads bring the current from outside. The case is emptied of air through a tube, and then filled with hydrogen at a reduced pressure, after which it is hermetically sealed.

Figure 6:
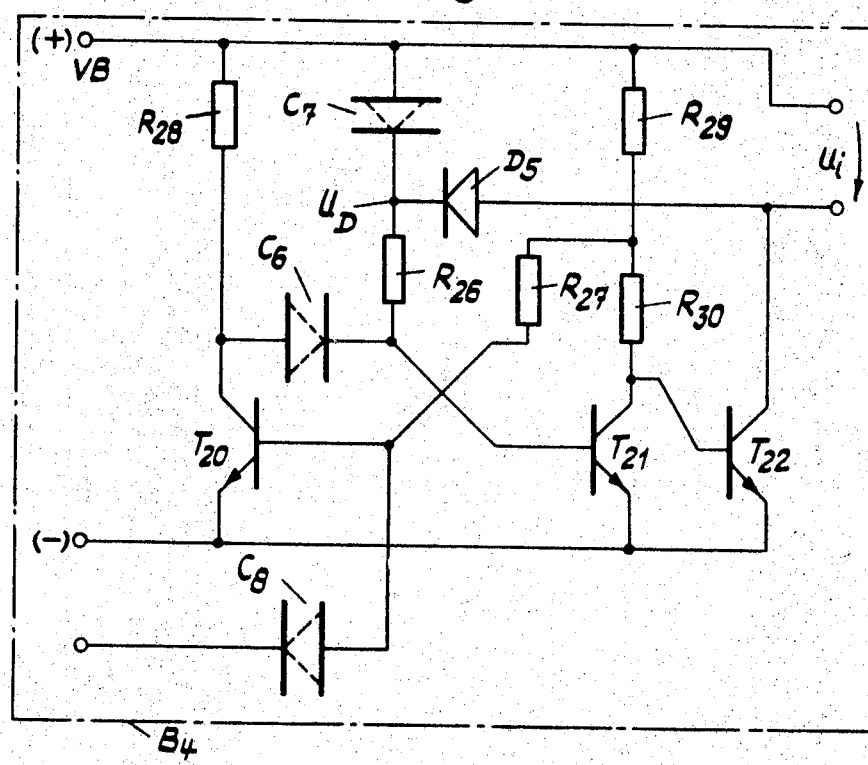
FIG. 6 shows the diagram of a motor control circuit, in the case where the motor is a resonant motor.

FIG. 6 relates to the second embodiment, in which the motor is a resonant motor. This embodiment enables a considerable saving in electronic circuits to be made thanks to a motor operating at a relatively high frequency (between about 100 and 500 Hz.). The quartz frequency may be for instance 10,000 Hz.; it is divided in the ratio of 32 (by means of 5 binary stages for instance) to a frequency of 312.5 Hz. Pulses of this frequency feed a mechanical resonator and keep it vibrating. A simple arrangement consists of a vibrating strip clamped in at one end and free at the other. The vibrating motion is then transformed into a rotary motion by means of a ratchet system.

The control circuit of the resonant motor, shown in FIG. 6, is composed of an univibrator and of an output stage. The univibrator is composed of the transistors $T_{20}$ and $T_{21}$, of junction capacities $C_6$, $C_7$ and $C_8$ each acting as an ideal condenser shunting a diode, and of resistances $R_{26}$–$R_{30}$. The output stage comprises the transistor $T_{22}$. In the position of rest the transistor $T_{20}$ is blocked, the transistor $T_{21}$ is saturated. The effect of a positive pulse, provided by the last stage of the frequency divider, and transmitted by $C_8$, is to saturate the transistor $T_{22}$. The negative jump in voltage at the collector of $T_{20}$ is transmitted, through $C_6$, to the base of $T_{21}$, which blocks. The voltage at the collector of $T_{21}$ increases, which keeps $T_{20}$ in the saturated state after the control pulse has disappeared, and also saturates the output transistor $T_{22}$ causing a current to flow in the motor. The function of the control circuit is to excite the motor so that its amplitude is as constant as possible. To achieve this, the duration of the pulses is made dependant on the battery voltage $V_B$ and on the amplitude of the voltage $U_i$, induced by the motor, which is proportional to the amplitude of the motion. This dependence is obtained by means of a diode $D_5$ and the capacity $C_7$, the purpose of which is to generate a voltage $U_D$ which is about proportional to $V_B+U_i$. This voltage determines in its turn the duratiton of the transitory state of the univibrator and, consequently, the duration of the pulses fed to the motor. The function of the dependency circuit is to increase the duration of the pulses if the voltage of the battery or the induced voltage decrease compared to their set value. In the first case, the power furnished to the motor is kept practically constant. In the second case, the power furnished to the motor adapts itself to the mechanical load and reduces the variations of the amplitude caused by irregularities of the teeth and of the friction. The circuit according to FIG. 6 can be realized in integrated shape on a single "spot" $B_4$. Its total consumption, including the motor, is less than 10 $\mu$w.

From the constructive point of view, the electric circuit of the watch can be constituted in the shape of several monolithic integrated circuits mounted on a cutout mounting plate and sealed in by a covering of synthetic material, several of these assemblies being in their turn arranged on a printed circuit and sealed in by a covering of synthetic material.

Thanks to the use of miniaturized electronic frequency dividers, it is possible to separate completely the "time base" function from that of the motor and to realize each one of them in the best possible conditions, and in particular, to choose for each of them the most favourable frequency. Given the actual possibilities of micro-electronics, the increased complexity of the system, in particular of its electronic circuits, is not a major drawback.

The principal advantages of the described watches are the following:

Running precision which is higher than that of actual wrist watches. Running error less than one second a day and possibility of reducing it to the tenth of a second a day and less.

It is conceivable that such a precision will make a resetting unnecessary between two battery changes and will thus allow the elimination of the external resetting mechanism.

Running of the watch insensitive to humidity and to variations of the atmospheric pressure owing to the regulating member (oscillating quartz) sealed in under vacuum.

Small variation of the frequency of the regulating member (quartz) in function of the temperature (typical running variation of 1 sec./day) in the temperature range 4 to 36° C.; (quadratic characteristic). In addition, this variation is a perfectly well defined mathematical function (parabola) which depends on the cut of the quartz. It is possible to compensate it by means of appropriate electronic circuits.

Perfectly negligible position error, owing to the high frequency of the quartz (less than $\frac{1}{100}$ of a sec./day).

Influenced of the support on the running also negligible.

Reduced isochronism defect (a variation of the voltage of the battery of 0.1 volt causes a variation in running of 0.1 sec./day).

Considerable resistance to shocks. The effect of linear or rotary shocks on the time base produces a static displacement of the quartz in relation to its case (temporary deformation of the elastic suspension wires under the influence of the forces of inertia applied to the quartz). One may speak of a static displacement because the shocks to which it is subjected during the normal use of the watch produce accelerations which vary slowly in relation to the period of oscillation. The perturbation in the running to which the time base is subjected in the course of a shock is thus negligible as long as the static displacement of the quartz does not bring it to touch its case. In the envisaged construction such an accident will not occur in the course of shocks the acceleration of which does not go beyond 300 times terrestrial acceleration (300 g.). This value represents a sufficient margin of security in respect of the accelerations normally observed at the wrist.

Insensitivity to external vibrations (of the support). If the watch comprises a step-by-step motor only vibrations the frequency of which is very close to that of the quartz will produce perturbations. This frequency is so high (8 to 10 kHz.) that such vibrations need not be feared if the watch is used normally. If the watch comprises a resonant motor, its operation may also be perturbed by vibrations the frequency of which is close to that of the motor (between 100 and 500 Hz.). Such a case is also most improbable.

Insensitivity to external magnetic fields. The quartz time base as well as a piezoelectric motor are totally insensitive to magnetic fields. An electrodynamic motor operates correctly in a field which does not go beyond 300 oersted, and shows no residual effect after having been subjected to a field of less than 1000 oersted. An electromagnetic motor, whilst more sensitive, is capable of withstanding the fields actually provided by horological standards (operation under 60 oersted, no residual effect under 300 oersted).

Consumption of electrical power is less than 20 $\mu$w. This consumption allows one (or two) battery (batteries) of 1.35 v., having a total capacity of 160 mah., to last 15 months. A renewal of the battery every 12 months is compatible with its guaranteed duration. The capacity envisaged is also compatible with the available volume. The use of two batteries connected in parallel allows a battery to be changed without interrupting the running (loss of the exact time) and without the time base stopping (problem of the ageing of the quartz).

To this end the use of two batteries connected in series may be envisaged, each battery having a lower voltage. This solution offers certain advantages.

Relatively simple construction of the watch. It is composed of a certain number of distinct blocs each representing a basic member, that is:

(1) battery
(2) sealed-in quartz
(3) electronc modules (flat packs)
(4) adjusting condenser
(5) printed circuit platen (or other arrangement) serving to interconnect the various components electrically
(6) motor actuating an anchor or a pawl
(7) wheelworks comprising an anchor or ratchet wheel and a train of gears driving the seconds, minutes and hours hands
(8) time setting mechanism
(9) platen.

Finally, suppression of the necessity of oiling and cleaning the mechanical parts periodically.

We claim:

1. An electronic watch comprising a piezoelectric time base including a quartz, a circuit for maintaining the oscillations of the quartz, a frequency dividing circuit operatively connected to said maintaining circuit, an electric motor for driving indicating members, means connecting the electric motor to the frequency dividing circuit, means connecting the electric motor to a circuit for controlling the motor characterized in that the maintaining circuit is symmetrical and is coupled to the frequency-dividing circuit by means of a separate amplifying circuit and in that the control circuit comprises amplifying components and pulse limiting components.

2. Electronic watch according to claim 1, characterized in that all the circuits are integrated in distinct blocs ($B_1$–$B_4$) and in that, in addition, the distinct blocs are connected to one another by printed circuits.

3. Electronic watch according to claim 1, characterized in that the said maintaining circuit comprises two symmetrical amplifying branches, each of which is composed of a transistor, of resistances connected to the collector of each transistor and of resistances connected to the emitter of each transistor and that the base of one of the transistors is connected to the collector of the other transistor and vice versa and that the vibrating quartz is coupled to the emitters of the transistors of the two branches.

4. Electronic watch according to claim 1, characterized in that the said maintaining circuit comprises two symmetrical amplifying branches, each of which is composed of a transistor, of resistances connected to the collector of each transistor and of resistances connected to the emitter of each transistor and that the base of one of the transistors is connected to the collector of the other transistor and vice versa and that the vibrating quartz is coupled to the emitters of the transistors of the two branches, and in that the collector of one of the transistors of the said maintaining circuit is coupled by means of a capacity to the base of a transistor of the said amplifying circuit and in that the collector of the transistor of the amplifying circuit is coupled by a resistance to the base of the same transistor and by a capacity to the said frequency dividing circuit.

5. Electronic watch according to claim 1, characterized in that the said amplifying circuit is a two-stage amplifier comprising semi-conductors.

6. Electronic watch according to claim 1, characterized in that the said amplifying circuit is coupled to the freqency dividing circuit by means of a pulse forming circuit generating an approximately square wave.

7. Electronic watch according to claim 1, characterized in that the said amplifying circuit is coupled to the frequency dividing circuit by means of a pulse forming circuit generating an approximately square wave and in that the said pulse forming circuit forms part of the said amplifying circuit and comprises diodes limiting the amplitude.

8. Electronic watch according to claim 1, characterized in that the said frequency dividing circuit comprises a multiplicity of tipping circuits coupled in cascade.

9. Electronic watch according to claim 1, characterized in that the said motor control circuit comprises elements determining the duration of the electric pulses for the motor.

10. Electronic watch according to claim 1, characterized in that the said motor control circuit comprises elements determining the duration of the electric pulses for the motor and in that the said control circuit comprises a first logical device having the function "NOR" each of the two inputs of which is coupled to one of two intermediate taps of different frequencies of the said frequency dividing circuit and the output of which is coupled to one of the inputs of a second logical device having the function "NOR," in that the second logical device is constituted by two transistors, the emitters of which are joined one to the other and the collectors of which are joined one to the other and form an output contact of the logical device and the bases of which are the two inputs of the device, and in that the base of one of the transistors is coupled to a first output of the frequency dividing circuit by means of a condenser and to the collector of a first additional transistor, the base of which is coupled in its turn to the collectors of the transistors of the second device and forming with the corresponding transistor of the second device, a tipping circuit.

11. Electronic watch according to claim 1, characterized in that the said motor control circuit comprises elements determining the duration of the electric pulses for the motor, in that the said control circuit comprises a first logical device having the function "NOR" each of the two inputs of which is coupled to one of two intermediate taps of different frequencies of the said frequency dividing circuit and the output of which is coupled to one of the inputs of a second logical device having the function "NOR," in that the second logical device is constituted by two transistors, the emitters of which are joined one to the other and the collectors of which are joined one to the other and form an output contact of the logical device and the bases of which are the two inputs of the device, in that the base of one of the transistors is coupled to a first output of the frequency dividing circuit by means of a condenser and to the collector of a first additional transistor, the base of which is coupled in its turn to the collectors of the transistors of the second device and forming with the corresponding transistor of the second device, a tipping circuit and in that the said control circuit comprises a third logical device having the function "NOR" and a second additional transistor which are connected and arranged symmetrically in relation to the said second logical device and to the said first additional transistor, and in that the base of a transistor of the said third device is coupled to the output of the said first logical device and that the base of the other transistor of the third logical device is coupled to a second output of the frequency dividing circuit.

12. Electronic watch according to claim 1, characterized in that the said motor control circuit comprises a monostable multivibrator device, the control input of which is connected to an output of the said frequency dividing circuit by means of a condenser and the output of which is coupled to the base of a commutation transistor which furnishes current pulses to the said motor.

13. Electronic watch according to claim 1, characterized in that the said motor control circuit comprises a monostable multivibrator device, the control input of which is connected to an output of the said frequency dividing circuit by means of a condenser and the output of which is coupled to the base of a commutation transistor which furnishes current pulses to the said motor and in that the said monostable multivibrator device comprises a resistance and a first condenser the charge of which determines, before each pulse, the duration of the said current pulses and in that a regulating device makes this charge dependent of a voltage induced by the motor.

14. Electronic watch according to claim 1, characterized in that the said motor control circuit comprises a monostable multivibrator device, the control input of which is connected to an output of the said frequency dividing circuit by means of a condenser and the output of which is coupled to the base of a commutation transistor which furnishes current pulses to the said motor, in that the said monostable multivibrator device comprises a resistance and a first condenser the charge of which determines, before each pulse, the duration of the said current pulses and in that a regulating device makes this charge dependent of a voltage induced by the motor and in that the said regulating device comprises a second condenser one of the terminals of which is connected simultaneously to the said resistance and to a diode and the other terminal of which is connected to one of the poles of a source of electricity and in that the said diode is connected to the output of the amplifier furnishing the pulses to the motor.

15. Electronic watch according to claim 1, characterized in that the said motor control circuit comprises a condenser and a commutation transistor connected in series with the said motor, in that another commutating transistor is connected in parallel with the motor and the condenser and in that the control inputs of the two commutating transistors are coupled to two outputs of different phases of the said frequency dividing circuit.

16. Electronic watch according to claim 1 characterized in that the said motor control circuit comprises a resistance ($R_{15}$) and a commutator (S) coupled to the electric circuit of the motor ($R_L$), and in that the commutator is actuated during the time-setting of the watch in order to make it possible to put either the motor or the resistance in circuit.

References Cited

UNITED STATES PATENTS 2,976,470   3/1961   Krassoievitch et al. ____ 58—23
3,212,252   10/1965  Naka _____ 58—23

RICHARD B. WILKINSON, Primary Examiner

E. C. SIMMONS, Assistant Examiner

U.S. Cl. X.R.
58—34